US011809523B2

(12) United States Patent
Kastaniotis et al.

(10) Patent No.: US 11,809,523 B2
(45) Date of Patent: Nov. 7, 2023

(54) ANNOTATING UNLABELED IMAGES USING CONVOLUTIONAL NEURAL NETWORKS

(71) Applicant: IRIDA LABS S.A., Patras (GR)

(72) Inventors: Dimitris Kastaniotis, Athens (GR); Christos Theocharatos, Patras (GR); Vassilis Tsagaris, Logos Egio (GR)

(73) Assignee: IRIDA LABS S.A., Patras (GR)

(*) Notice: Subject to any disclaimer, the term of this patent is extended or adjusted under 35 U.S.C. 154(b) by 54 days.

(21) Appl. No.: 17/178,717

(22) Filed: Feb. 18, 2021

(65) Prior Publication Data
US 2022/0261599 A1    Aug. 18, 2022

(51) Int. Cl.
*G06T 7/00* (2017.01)
*G06F 18/214* (2023.01)
*G06T 7/11* (2017.01)
*G06N 3/04* (2023.01)
*G06N 3/088* (2023.01)
*G06F 18/24* (2023.01)

(52) U.S. Cl.
CPC .......... *G06F 18/2155* (2023.01); *G06F 18/24* (2023.01); *G06N 3/04* (2013.01); *G06N 3/088* (2013.01); *G06T 7/11* (2017.01); *G06T 2207/20081* (2013.01); *G06T 2207/20084* (2013.01)

(58) Field of Classification Search
CPC ...... G06K 9/6259; G06K 9/6267; G06N 3/04; G06N 3/088; G06T 7/11; G06T 2207/20081; G06T 2207/20084; G06V 10/25; G06V 10/26; G06V 10/774; G06V 10/82
See application file for complete search history.

(56) References Cited

U.S. PATENT DOCUMENTS

| | | | | |
|---|---|---|---|---|
| 2021/0027103 A1* | 1/2021 | Brower | ............... | G06K 9/6257 |
| 2021/0142107 A1* | 5/2021 | Vineet | ............... | G06V 10/774 |
| 2021/0241034 A1* | 8/2021 | Laradji | ............... | G06V 10/764 |

(Continued)

OTHER PUBLICATIONS

Pinheiro Pedro O et al: "Learning to Refine Object Segments", Computer Vision—ECCV 2016—14th European Conference, Oct. 11-14, 2016, vol. 9905, pp. 75-91, XP055828334 (Year: 2016).*

(Continued)

*Primary Examiner* — Ping Y Hsieh

(74) *Attorney, Agent, or Firm* — Jason H. Vick; Sheridan Ross, PC

(57) ABSTRACT

A method and information storage media having instructions stored thereon for supervised Deep Learning (DL) systems to learn directly from unlabeled data without any user annotation. The annotation-free solutions incorporate a new learning module, the Localization, Synthesis and Teacher/Annotation Network (LSTN) module, which features a data synthesis and generation engine as well as a Teacher network for object detection and segmentation that feeds the processing loop with new annotated objects detected from images captured at the field. The first step in the LSTN module learns how to localize and segment the objects within a given image/scene following an unsupervised approach as no annotations about the objects' segmentation mask or bounding box are provided.

6 Claims, 13 Drawing Sheets

(56) References Cited

U.S. PATENT DOCUMENTS

2021/0287054 A1\* 9/2021 Zhang ............... G06V 10/764
2022/0012530 A1\* 1/2022 Singh .................. G06N 3/08

OTHER PUBLICATIONS

Anonymous: "Unsupervised learning", Wikipedia, Feb. 16, 2021, pp. 1-3, XP055918811 Retrieved from the Internet: https://en.wikipedia.org/w/index.php?title-Unsupervised_learning&oldid=1007200825 (Year: 2021).\*

Zhou Bolei et al: "Learning Deep Features for Discriminative Localization", 2016 IEEE Conference on Computer Vision and Pattern Recognition (CVPR), Jun. 27, 2016, pp. 2921-2929, XP033021473 (Year: 2016).\*

Anonymous "Unsupervised Learning" Wikipedia; pp. 1-3; Feb. 16, 2021.

Pinheiro, Pedro O. et al. "Learning to Refine Object Segments" Springer International Publishing AG 2016; ECCV 2016, Part I, LNCS 9905, pp. 75-91, 2016.

Zhou, Bolei et al. "Learning Deep Features for Discriminative Localization" IEEE Conference on Computer Vision and Pattern Recognition; 2016.

International Search Report for International Application No. PCT/B2022/051331, dated May 18, 2022.

Written Opinion for International Application No. PCT/IB2022/051331, dated May 18, 2022.

International Preliminary Report on Patentability for International Application No. PCT/IB2022/051331; dated Aug. 31, 2023.

\* cited by examiner

Localization, Synthesis and Teach Network (LSTN) Module Description

ANNOTATING UNLABELED IMAGES USING CONVOLUTIONAL NEURAL NETWORKS

BACKGROUND

Field

This technology relates to the field of machine learning and deep learning methods and systems with applications in visual understanding that learn to solve supervised learning tasks such as image recognition, object detection and image segmentation without requiring annotated data. More specifically, it is associated with semi-supervised, weakly supervised, self-supervised learning and similar approaches that try to reduce or eliminate the amount of annotated data required for training.

Description of the Related Art

The emergence of deep learning models brought a renaissance and defragmented the development of computer vision and machine learning solutions. As compared with hand crafted features, where the data were processed according to a user defined function and shallow learning methods that were able to learn low-level feature representations, deep learning models presented a new learning paradigm. With this paradigm, deep learning architectures can learn high-level feature presentations of image, video or sequence data in an end-to-end manner. However, these models require large amounts of annotated data, are prone to overfit and/or learn biases from data, limiting the applicability and scalability of these models in real world problems.

Furthermore, in real world problems it is often very difficult to collect large amounts of data that are also representative to the actual deployment environment— which is mandatory for achieving the optimal (close or better than human-level) performance. Especially, the collection of data from the field is in most cases impossible and can take place only after deploying hundreds of image sensors that will produce vast amounts of data. Additionally, training the system after deploying the vision sensors introduces significant delays and increases costs, as systems need to be operational after the first deployment and underperform on the task they are designed for. Annotating the on-field data requires a lot of effort, is time consuming, while the quality of the annotations can heavily affect the model.

Image labeling is the first and most significant part of object detection, giving insight into the content of images. An image is considered as labeled if the image itself is assigned to (or considered to belong to) a specific image class, or if the objects contained within the image are assigned to (or considered to belong to) a specific image class. If the labeling refers to particular objects inside the image, then manual annotation is normally performed in which bounding boxes are usually assigned around the target objects in order to define their location within a given image. Annotation and labeling is a very time-consuming procedure, but the more commitment is given to image labelling the more accurate a deep learning model can be. While usually rectangular bounding boxes are used to describe the location of the objects, annotation can be performed with three dimensional bounding boxes, rotated or arbitrary shaped bounding boxes, or segmentation masks. In the latter case, the object surface is being annotated in pixel level resulting into a binary mask. These particularities pose significant limitations for the enablement of deep learning solutions in real world applications. Also, after successfully training and deploying these solutions, it is usually required to monitor the system being deployed in order to verify that the system is performing well even if the distribution of the underlying data has not changed.

While approaches like semi-supervised, weakly-supervised and self-supervised learning try to compensate for this limitation, they (i) usually fail as they incorporate biases from collected data and their annotations, (ii) fail to scale-up due to data insufficiency and (iii) are not designed to make use of real-world data. Also, current approaches do not provide a solid methodology to combine annotation-free learning with continuous and lifelong-learning, or take advantage of prior knowledge provided from a "teacher" deep convolutional neural network (CNN) model or in a form of annotated datasets.

SUMMARY

A system and a method are disclosed herein for training deep CNNs from few examples of the target objects, enabling the system to learn totally from non-annotated data collected on the field and thus eliminating the need for data annotation. This approach is applicable for the tasks of supervised and semi-supervised image recognition, image segmentation and object detection. This is achieved by a special module that allows the system to learn from a few images captured by the system(s) being deployed on the field, or collected by the user, or designed in a 3D computer graphics environment, or collected by a specialized apparatus casting the role of a registering device without requiring user annotation. To achieve this, the system incorporates a module named LSTN (Localization, Synthesis and Teacher/Annotation Network) that learns to (1) segment, localize and classify objects in an image without any user interaction, (2) synthesize and generate annotated data starting with only a few samples of the target objects and (3) learn to segment and detect objects in order to robustly annotate new incoming data as well as to guide the training of a smaller network to be deployed at the edge.

The LSTN module is composed by three main components, namely the Localization, the Synthesis and the Teacher/Annotation Deep CNN network which are briefly summarized hereafter.

The Localization component is implemented using a combination of (i) any Deep CNN classification network with Global Average Pooling (GAP) or Global Max Pooling (GMP) to enable the utilization of Class Activation Maps (CAMs). CAMs are then produced by computing the sum of the feature maps right before the pooling operation weighted by the activations of the classification layer and normalized by the softmax function to provide soft object proposals. Therefore, CAMs soft object proposals provide a probability value for whether or not a pixel belongs to a particular category followed by (ii) a second model which learns to distinguish the object from its background using weak labels generated by putting a threshold on the soft object proposals generated by the CAMs. This network can be trained by learning to classify image pixels into foreground or background by learning a classification task on image patches or by learning to segment the object via a segmentation task.

The first classification network is trained on the available object samples to localize the objects by learning to finely segment them from the background in a totally unsupervised learning manner (a.k.a. no segmentation mask information or any boundary information is needed). This is achieved by first initializing the weights by learning in a self-supervised manner and then in a regular image classification task. The image classification task produces CAMs, generating weak binary masks around the objects which are used as weak labels for the problem of image segmentation.

Using the weak labels created by (i) and given that a small number of object images is available, a second CNN classification or segmentation model is trained in a weakly supervised learning approach to distinguish between foreground and background. Also, relations between different parts of the image are being considered to further improve the performance of the segmentation. Once this step is completed the module is able to perform object segmentation and bounding box regression.

By utilizing these two steps ((i) and (ii) above) the module is able to learn to finely segment, localize and classify the objects within the given images without requiring any user input regarding annotation (e.g. boundaries or bounding boxes) or user feedback regarding the boundaries of the objects.

In the Synthesis component, the module learns to generate novel annotated samples by combining traditional computer vision, 3D graphics, differentiable rendering engines with inverse graphics and generative models. In particular, given the segmentation masks of the previous step, the system generates novel scenes in the following ways: a) by projecting via affine and perspective transforms of the masked objects in novel scenes with backgrounds generated by a GAN (Generative Adversarial Network) pretrained offline in a large number of backgrounds and b) by learning to map the silhouette of the objects in 3D models and generating novel poses via 3D data synthesis using computing graphic engines and/or differentiable renderers. In this way, a large number of real, artificial (generated by image synthesis) and synthetic (generated with 3D graphics) annotated images can be generated without requiring any manual annotation. The annotated data produced via the data synthesis component enables a machine learning system to start operating with no available data, by having only a few images of the objects to be learnt.

Finally, the presented Teacher/Annotation Network is trained on the generated real and synthetic annotated data to perform the task of object segmentation and detection. The Teacher network is then able to annotate new data, performing in this way an automatic annotation process that is useful if data from other sources are available or data from the field are getting collected. The Teacher network is also used to train the final CNN model that will be released in production (at the edge devices) via knowledge transfer using a distillation approach in a Teacher-Student scheme. After system deployment, newly acquired data are fed to the system continuously and the Teacher Network provides the required annotation operating in an auto-labeling fashion without requiring any human intervention or annotation.

Therefore, the system and method can learn to generate annotated data directly from data without any user annotation, a procedure that is considered as an annotation-free learning scheme, for the task of object detection, image segmentation and classification. This is accomplished by using as input only a few sample images provided by the user, or collected from the field, or obtained from a special registration system, or via 3D models of the objects created in 3D computer graphics environment. The overall approach is related with life-long learning, continuous learning and incremental learning approaches that can learn how to improve their performance or augment their knowledge by utilizing data observed during deployment or provided as input by the user.

The exemplary LSTN module also features significant properties that automate the continuous development and integration of deep learning models by (1) learning to synthesize annotated data given only a few samples of the target objects, (2) continuously increasing the object set by adding newly detected objects via an annotation network and (3) supporting the training of the end-model to be released at edge devices via knowledge transfer using a distillation approach by following a Teacher-Student scheme. The overall approach is related with life-long learning, continuous learning and incremental learning approaches that learn how to improve their performance or augment their knowledge by utilizing data observed during deployment or provided as input by the user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
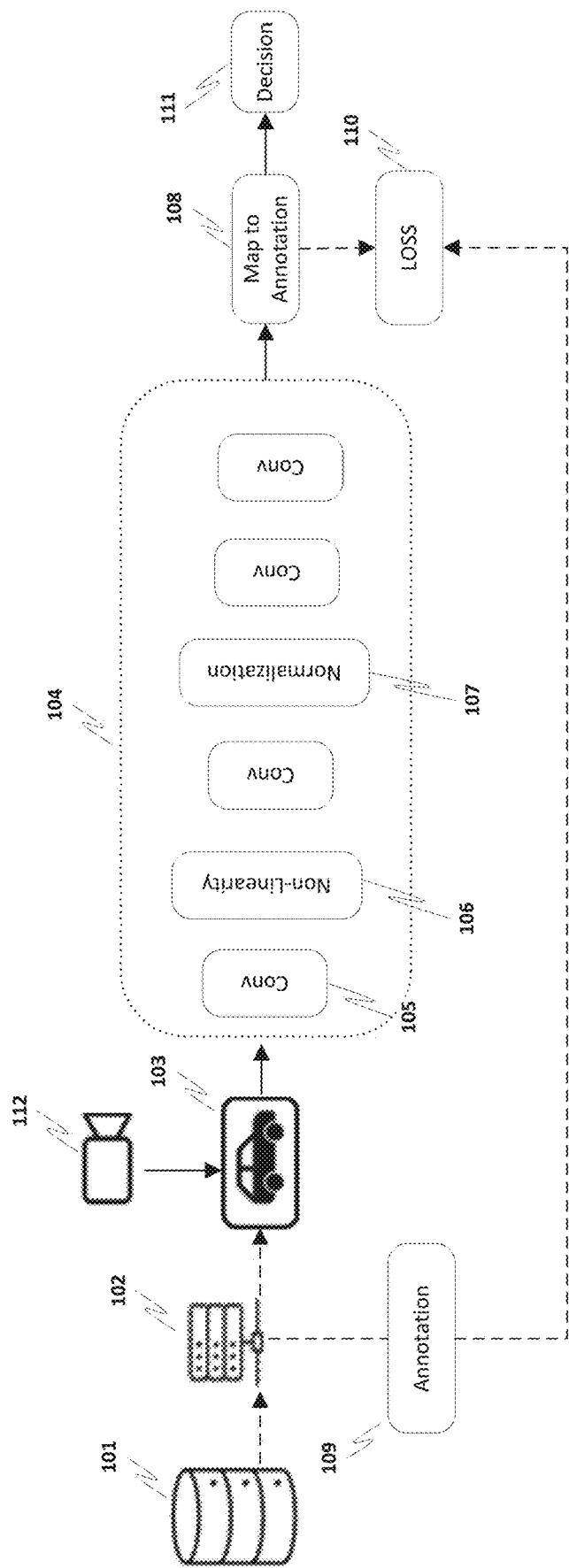
FIG. 1 is a diagram illustrating the CNN training and inference procedure.

1. Supervised Learning of Deep CNNs with Annotated Data

A feedforward Deep CNN (104 FIG. 1), in its basic form, is composed by a large number of convolutional layers (105 in FIG. 1) stacked sequentially, towards a feedforward processing scheme, with some non-linearities (106 in FIG. 1) or normalization layers (107 in FIG. 1) in between. The network is trained in an end-to-end and online manner using typically a large number of annotated images (101 in FIG. 1) from which only a few images (103 in FIG. 1) and their annotations (109 in FIG. 1) are sampled (102 in FIG. 2) at every iteration. The Deep CNN model is trying to minimize a differentiable cost function or combination of differentiable cost functions (110 in FIG. 1) between the ground truth annotations and those predicted by the network (108 in FIG. 1) using forward and backward passes to make predictions and update the weights of the learnable modules respectively.

During inference, the network is getting only one image (103 in FIG. 1) captured from an image source (112 in FIG. 1), which is then processed by the CNN (104 in FIG. 1) in order to provide the output decision (111 in FIG. 1).

FIG. 1 is CNN workflow for training (101,102,103,104, 108,110 and 101,102,110) and inference procedure from an image source (112, 103, 104, 108, 111).

The previously described procedure utilizes slight modifications of the feedforward processing scheme to perform the tasks of image classification, segmentation and object detection.

For image classification the network uses a large number of images assigned to a category (201 in FIG. 2) and trained in an online manner by sampling (202 in FIG. 2) batches of input images (203 in FIG. 2) with their labels (207 in FIG. 2) using a CNN (204 in FIG. 2) and a layer, in order to map an image to an output response vector (205 in FIG. 2), usually a one-hot vector, that is later assigned to a specific category (209 in FIG. 2). After computing the loss function (206 in FIG. 2) the error is backpropagated and the parameters of Deep CNN are updated.

Figure 2:
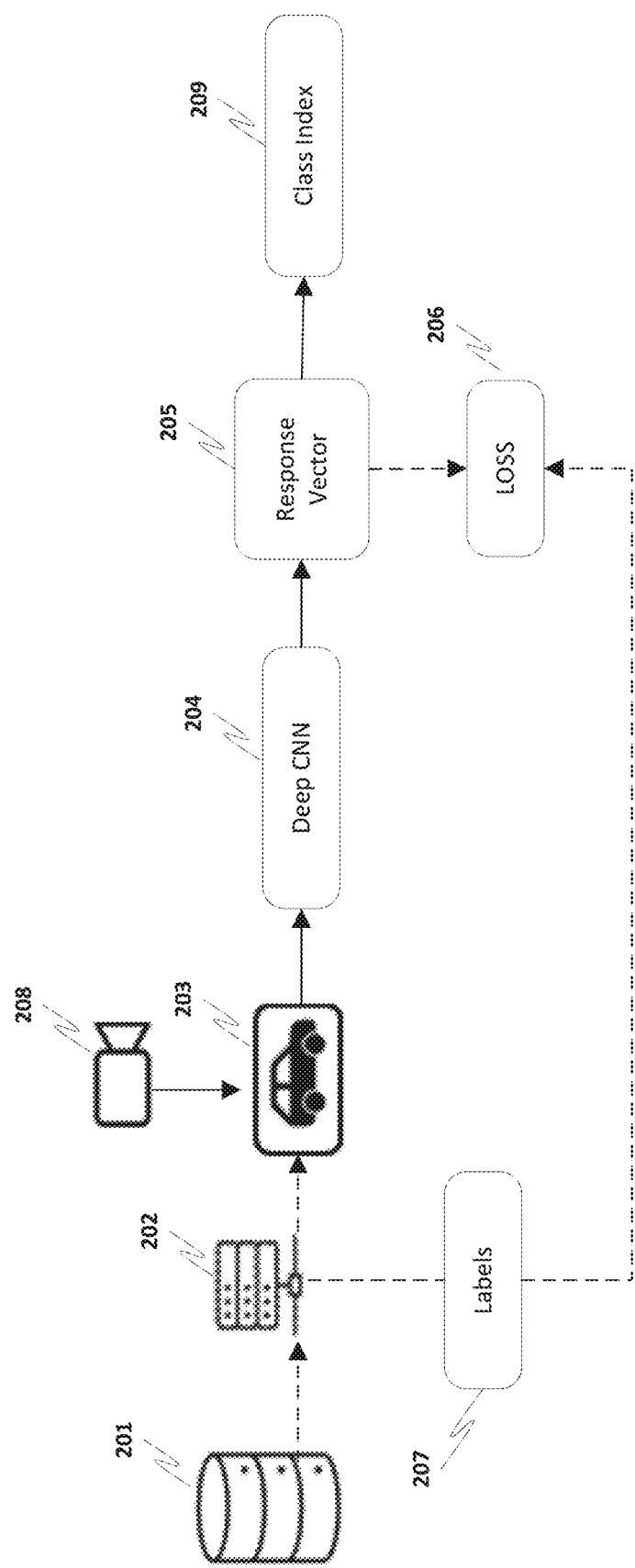
FIG. 2 is a diagram illustrating the image classification CNN training and inference procedure.

FIG. 2 is an image classification CNN workflow procedure. During training the image data follow the path 201, 202, 203, 204, 205 and then 206 to compute the loss with the ground truth data through 201, 202, 207, 206. During inference, data (203) captured from an image sensor (208) are feed directly to the CNN (204) in order to produce the response vector (205) from which the class index (209) is computed (prediction).

For the segmentation task, the network learns to classify each pixel to a category (semantic level segmentation) or to simply discriminate between different areas (instance level segmentation). The network is trained in an online manner using small batch of images (303 in FIG. 3) sampled (302 in FIG. 3) from a pool of images (301 in FIG. 3) and their corresponding pixel level annotation masks (304 in FIG. 3). The CNN (305 in FIG. 2) maps each input image to a high-level feature representation corresponding to a segmentation mask (306 in FIG. 3). After computing the loss function (307 in FIG. 3) the error is backpropagated and the parameters of the Deep CNN are then updated.

Figure 3:
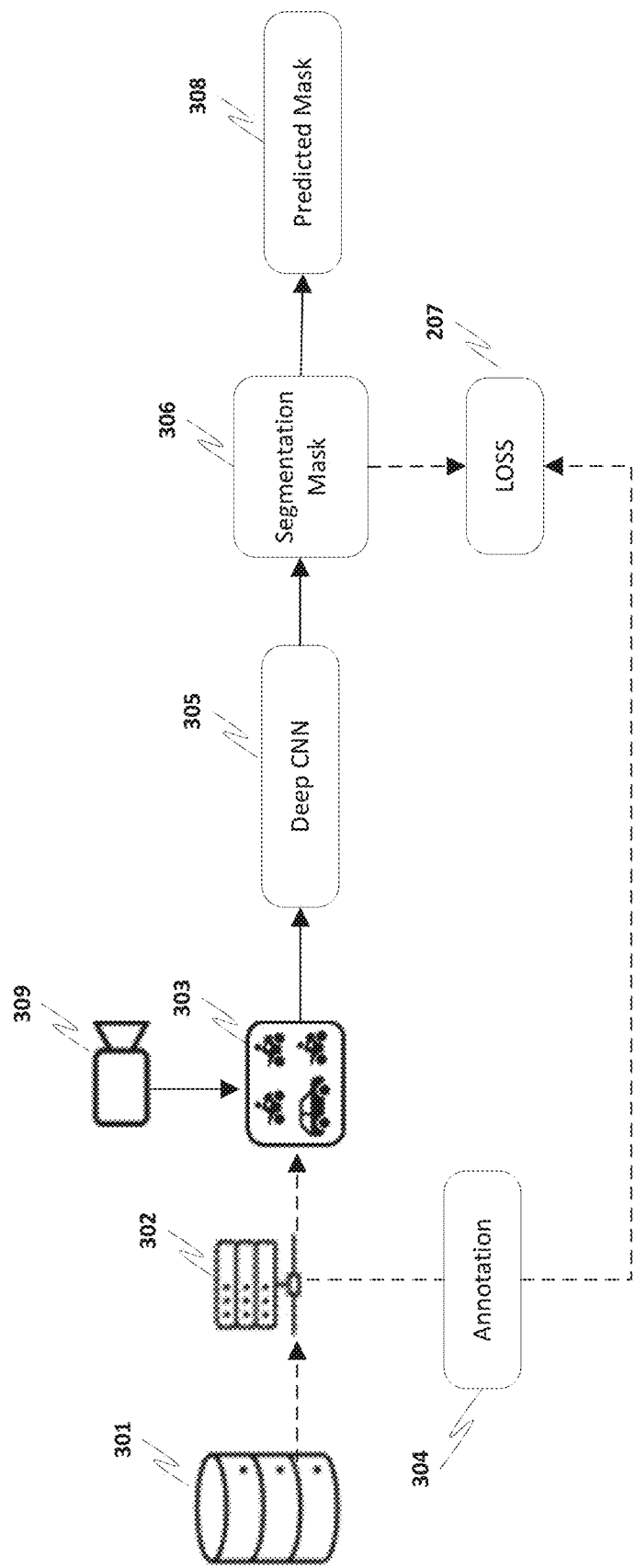
FIG. 3 is a diagram illustrating the image segmentation CNN training and inference procedure.

FIG. 3 is an image segmentation CNN workflow procedure. During training the network produces an estimated segmentation mask following the path 301, 302, 303, 305, 306 to the loss function 307 and also follows 301, 302, 304 to 307 to provide the ground truth segmentation mask. During the inference part the CNN receives an image (303) from an image sensor (309) which is then processed by the CNN in order to produce the segmentation mask (306), from which the final predicted mask can be obtained (308).

For object detection, the network is trained to regress the bounding box, or rotated rectangles, or arbitrary shaped rectangles, or 3-dimensional bounding box. In particular, the network is trained on a large number of images and their annotations (401 in FIG. 4) by sampling small batches of images (403 in FIG. 4) and their object location annotations (407 in FIG. 4), which are then processed by a CNN (404 in FIG. 4) in order to regress the object's location and class (405 in FIG. 4). The loss function (406 in FIG. 4) is computed between the regressed object location with the class information (405 in FIG. 4) and the ground truth object annotation (407 in FIG. 4). The output of the object detection CNN workflow procedure is the predicted boxes and the associated class indices (408 in FIG. 4) of the objects within the input images (403 in FIG. 4).

Figure 4:
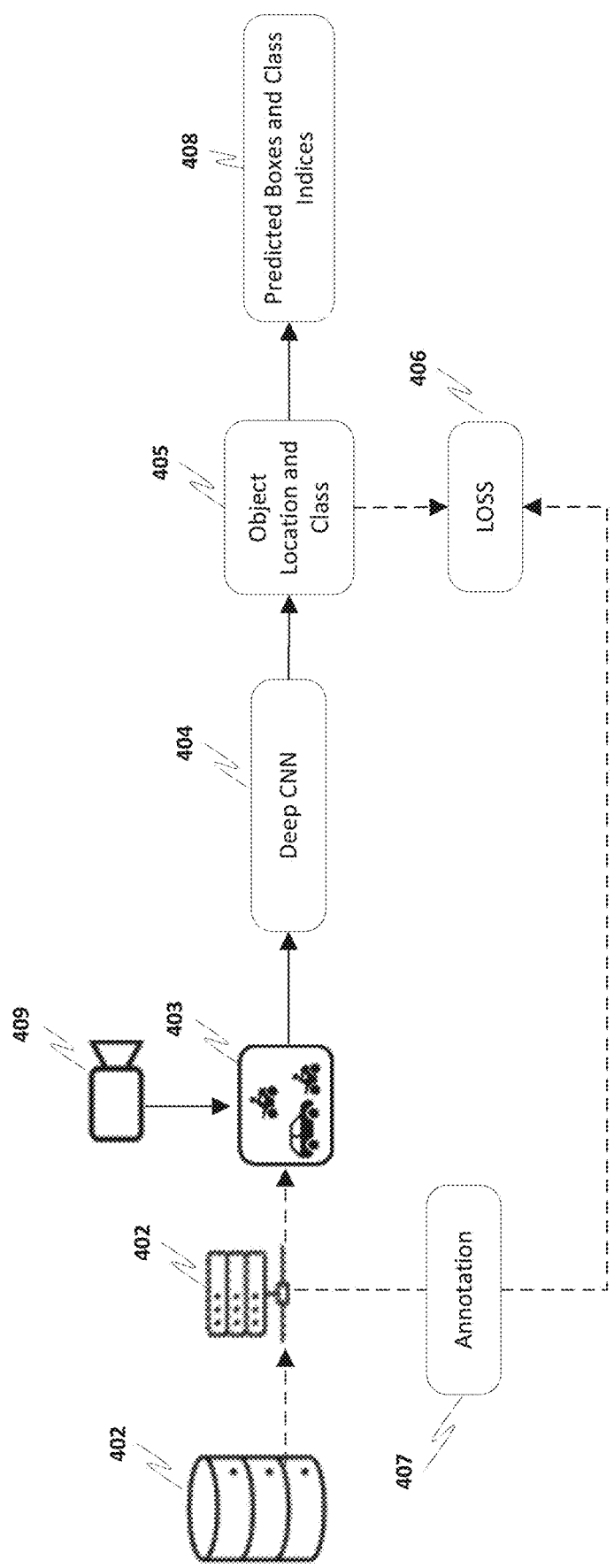
FIG. 4 is a diagram illustrating the object detection CNN training and inference procedure.

FIG. 4 is an object detection CNN workflow procedure. During training, an image or batch of images (403) is sampled (402) from a dataset (401) and processed by the Deep CNN (404) to produce the object location and class information (405), which is then send to the loss module (406) together with the ground truth annotations (407) sampled (402) from the training data (401). During inference, the CNN receives an image (403) from an image sensor (409), which is then processed by the CNN in order to produce the regressed object localization with the class index (405), from which the final predicted boxes and class indices can be obtained (408).

Additionally, to the main CNN architecture presented in FIG. 2, FIG. 3 and FIG. 4, combinations of CNNs are also feasible. A commonly used combination is the object detection and segmentation CNN which can be described as a mix of FIG. 3 and FIG. 4 by utilizing both the 306 in FIGS. 3 and 405 in FIG. 4. In this case the network samples (502 in FIG. 5) images (503 in FIG. 5) along with their bounding boxes and segmentation masks (505 in FIG. 5) from a large pool of annotated images (501 in FIG. 5). Afterwards a Deep CNN learns to regress both the object's location and class index (506 in FIG. 5) as well as the segmentation mask (507 in FIG. 5). The loss function (508 in FIG. 5) is computed for both tasks and the network parameters are being updated towards minimizing this loss function. The output of the joint object detection and segmentation CNN workflow procedure are the predictions (bounding boxes, masks and associated class indices, 509 in FIG. 5) of the objects within the input images (503 in FIG. 5).

Figure 5:
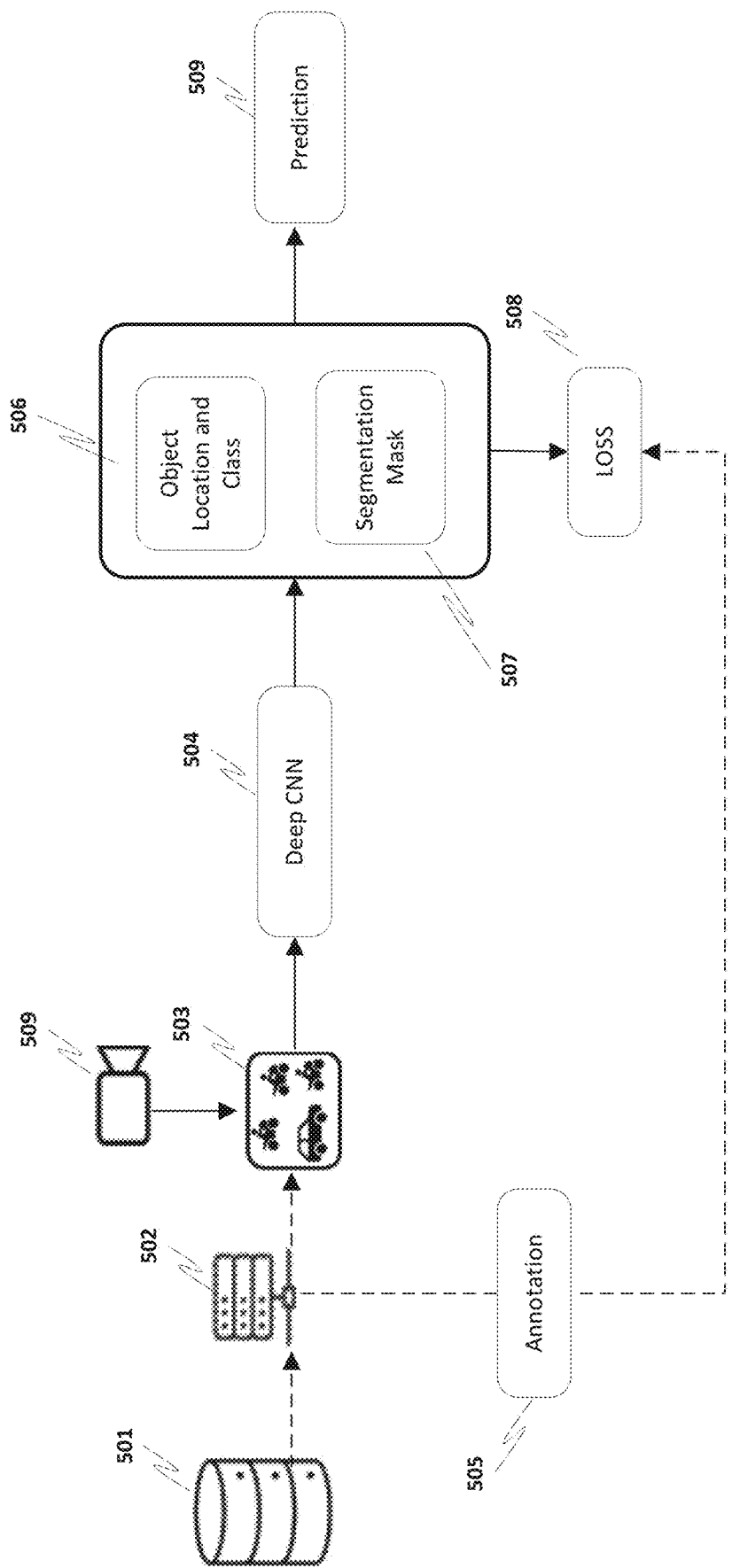
FIG. 5 is a diagram illustrating a joint image segmentation and object detection CNN training and inference procedure.

FIG. 5 is a joint object detection and segmentation CNN workflow procedure. During the training phase, the network samples (502) images (503) form a database (501) that are processed by a Deep CNN (504) in order to produce the object location and class (506) as well as the segmentation mask info (507). These outputs are then directed to the loss function (508) which computes the cost between the predicted values and the ground truth annotation (505). During inference, an image (503) is sampled from an image source (409), processed by the CNN (504) and outputs the predicted object locations (506) and segmentation mask (507) from which only the prediction output is used (509).

Generally, a Deep CNN is a non-parametric model that learns the mapping between input space (image) and output space, which can be described as follows: f: X→Y, where $X \in \mathbb{R}^{M \times N \times C}$ and Y can be a subset of integers, a combination of vectors and subset of integers in case of object detection or a mapping to a N dimensional image in case of segmentation.

In the typical scenario, during a deep learning development lifecycle, machine learning engineers or data scientists or annotation experts (602 in FIG. 1) need to initially annotate the available data (601 in FIG. 1) coming from the field (606 in FIG. 1) (e.g. the edge devices). The annotated data that are generated through the annotation process (603 in FIG. 1) are used to train a deep learning model (605 in FIG. 1), which will be deployed at the edge devices once it meets some specified criteria (or specifications) evaluated from the performance on a test set (604 in FIG. 1). Several iterations need to be performed to improve the model's performance by utilizing new data, or new sampling and annotation strategies, or even by changing the DL model. Once the end model is tested, verified and approved by data scientists (608 in FIG. 1), it is pushed back to the edge devices for actual deployment. When new data become available, this process is repeated by following the path (607 in FIG. 1). However, real-world applications are characterized from the low amount of training data being available, or the low amount of annotated data or by poor data annotation.

Figure 6:
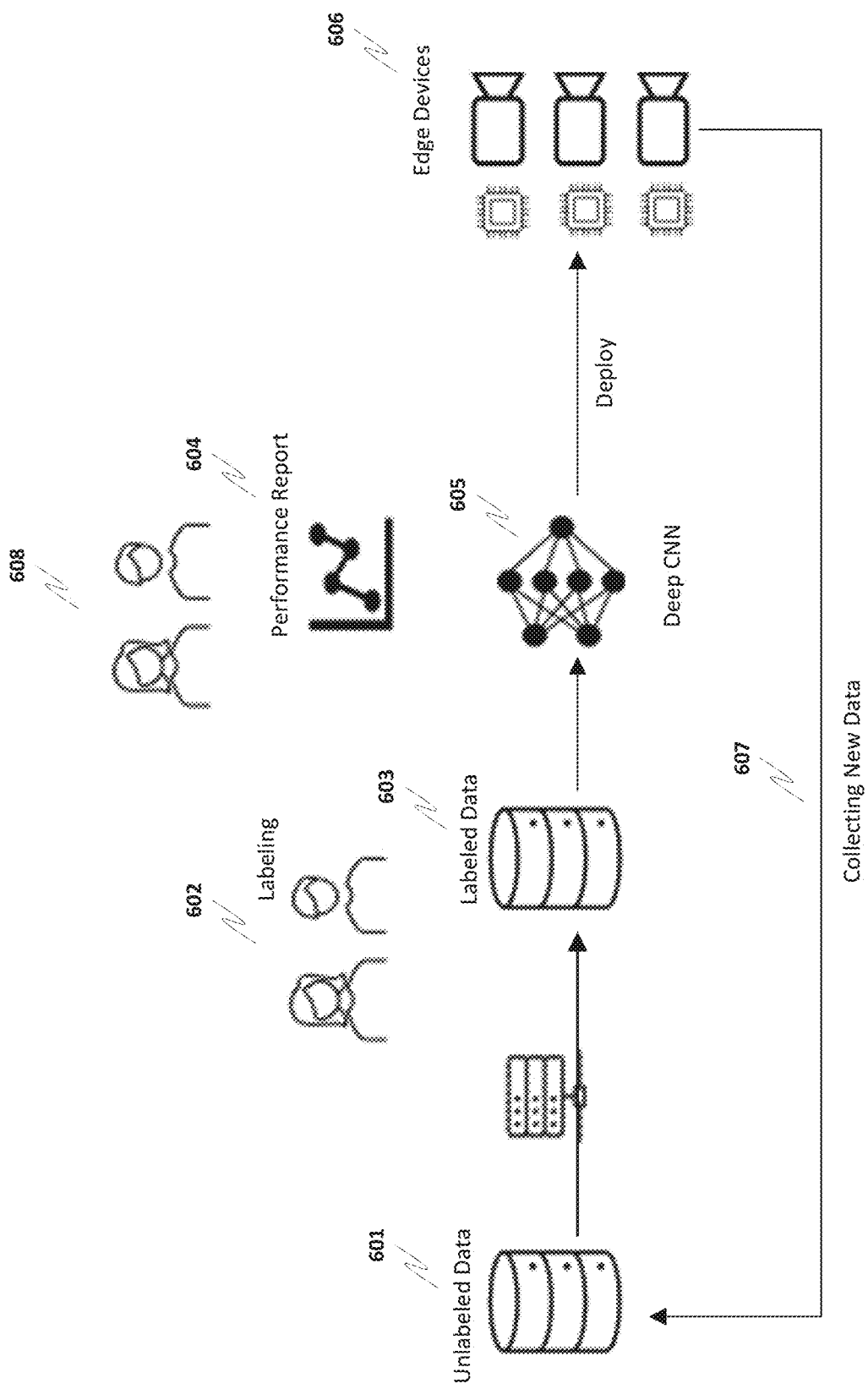
FIG. 6 is a diagram illustrating the conventional approach in training and deploying Convolution Neural Networks.

FIG. 6 is a classic approach in training and deploying CNNs. Massive amounts of data are being annotated by experts in order to train the CNN model.

2. Annotation-Free Learning Via Few-Shot and Incremental Learning for Continuous Release and Updates of Deep Learning Models

2.1. Architecture Overview

The architectural approach (FIG. 2) incorporates the LSTN module that enables the annotation-free learning scheme to operate in real-world conditions, by also allowing continuous development and deployment without requiring any human intervention in the data labeling process.

Figure 7:
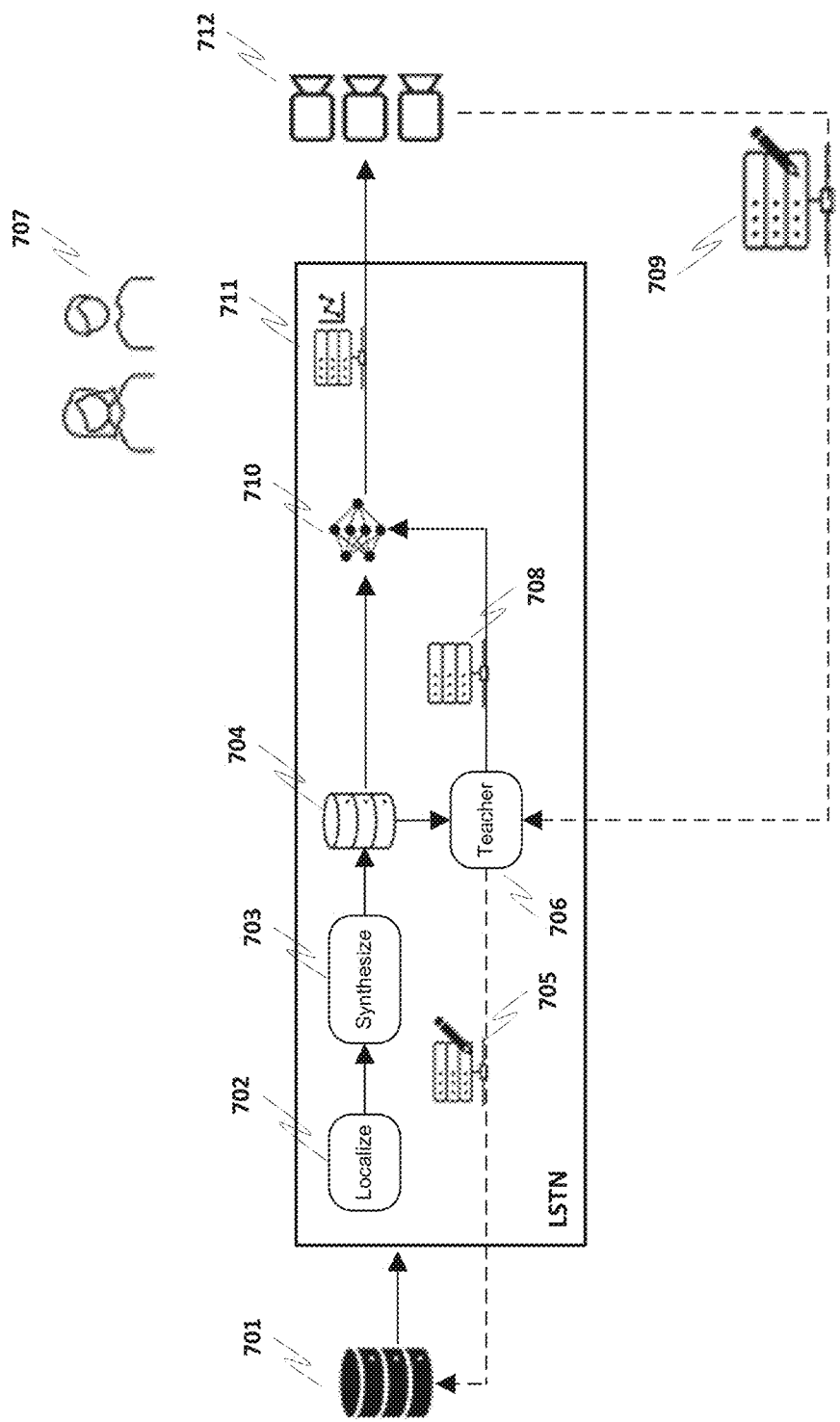
FIG. 7 is a diagram illustrating the approach for the label free learning methodology and several components provided by the technologies described herein.

FIG. 7 is an overview of the approach for annotation-free learning.

The inputs to the system can be one or more of the following: (1) the object samples (701 in FIG. 7) of interest, (2) images captured from on-field sensors (devices), (3) 3D synthetic data of the target objects, and/or (4) objects detected automatically by the Teacher/Annotation network after the first deployment of the system on the field. These input data are propagated to the LSTN module and in particular to the localization module (702 in FIG. 7), which learns to localize objects within the given data (i.e. images or video frames) both in terms of segmentation (FIG. 3) as well as in terms of object detection (FIG. 4), following a weakly self-supervised learning scheme.

These localized objects, represented as pictures with a segmentation mask, are then fed to the data synthesis module (703 in FIG. 2) which creates artificial and synthetic data (704 in FIG. 7). The synthetic data are used to train a Teacher network, which is a deep CNN with high-learning capacity (706 in FIG. 7) implementing a network combining a segmentation and object detection module (FIG. 3 and FIG. 4). The synthetic data are also used to train the AI model to be deployed at the edge devices operating on the field (710 in FIG. 7) using supervision from the Teacher network (708 in FIG. 7).

After deploying the model on the field depicted as 711 in FIG. 7, the on-field vision sensors (712 in FIG. 7) start operating and collecting encrypted data that are send back to the LSTN module in order to be processed by the Teacher Network. The deployed sensors are equipped with an extra functionality that can run on the vision system or on a separate device near the sensors (709 in FIG. 7). The role of this functionality is to select samples to be sent back to the LSTN module. The sample selection module checks whether a sample belongs to the data distribution that was available for training the serving model. In order to check if a sample belongs to the specific distribution, a vectorial representation of the input sample is performed—computed by the AI model trained for inference—and checked if it is inside the predefined distribution. This operation can also be performed in a device located near to the sensors called Near Edge Device (NED) depicted as 709 in FIG. 7, which can perform the sampling centrally by considering the distribution of the samples collected by all sensors. Alternatively, a Generative Adversarial Network (GAN) can be used to identify samples belonging (or not) to the distribution, by training a Discriminator network with the data that are available to the Teacher network and evaluating new samples at the deployed devices. The sampling approach significantly minimizes the amount of data being transferred back to the system for training.

The on-field, real-world data that are provided back to LSTN are processed by the Teacher network implementing a network combining a segmentation and object detection module (FIG. 3 and FIG. 4) in an annotation mode, in order to detect similar objects that appear in the scene. The images presenting the higher confidence score (above a specific fixed threshold) are qualified and stored in the initial object database (701 in FIG.7) following a write operation (705 in FIG. 7). The overall procedure is being monitored by the data scientist(s) or engineers (707 in FIG. 7) who are able to monitor and evaluate the performance of the model in the Teacher/Annotation network (710 in FIG. 7), the lightweight Deep CNN (711 in FIG. 7) as well as at the deployed devices (712 in FIG. 7). During the monitoring procedure, by only inspecting the performance of the system, the engineer can spot some corner cases during deployment and verify that the user experience is in accordance with the obtained results during the Teacher/Annotation and lightweight Deep CNN network training.

Figure 8:
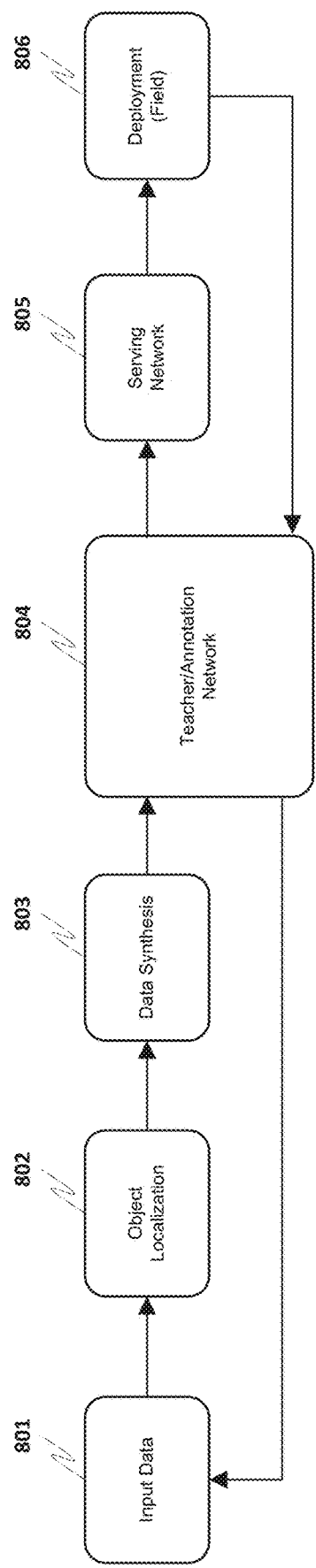
FIG. 8 is a flowchart showing the processing pathways of the LSTN module.

This iterative procedure is able to support and sustain the continuous development of deep learning AI models running at the edge, following a lifelong and incremental learning approach as new objects can naturally be added by the user at any time. The flowchart of FIG. 8 is presenting this iterative procedure, consisted by two pathways. The first is moving from the left to the right (801, 802, 803, 804, 805 to 806 in FIG. 8), where input data are being used to synthesize the training set and train the Teacher/Annotation network as well as the network to be deployed at the edge. The second pathway follows the path from the right to the left (806, 804 to 801 in FIG. 8), where data from the field are being processed by the Teacher/Annotation network in order to be included in the training loop at a later stage and continuously improve the performance of the deployed (at the edge devices) CNN model in an incremental learning and active learning scheme.

FIG. 8 is the processing pathways of the LSTN module.

The "heart and soul" of the system architecture summarized in the LSTN module is described in more details hereafter.

2.2. The LSTN (Localization, Synthesis and Teacher Network) Module

The LSTN module is the core module that enables a deep learning system to learn the target task by using only a few sample images of the target objects as a starting point, without any (human) annotation input. The workflow of the LSTN module is presented here in two pathways. The first pathway (upper path of FIG. 4) utilizes the architecture and operations from the input data to the deployment of the deep learning model. The second stream is following the pathway from the deployments back to the input data (lower path of FIG. 9).

Figure 9:
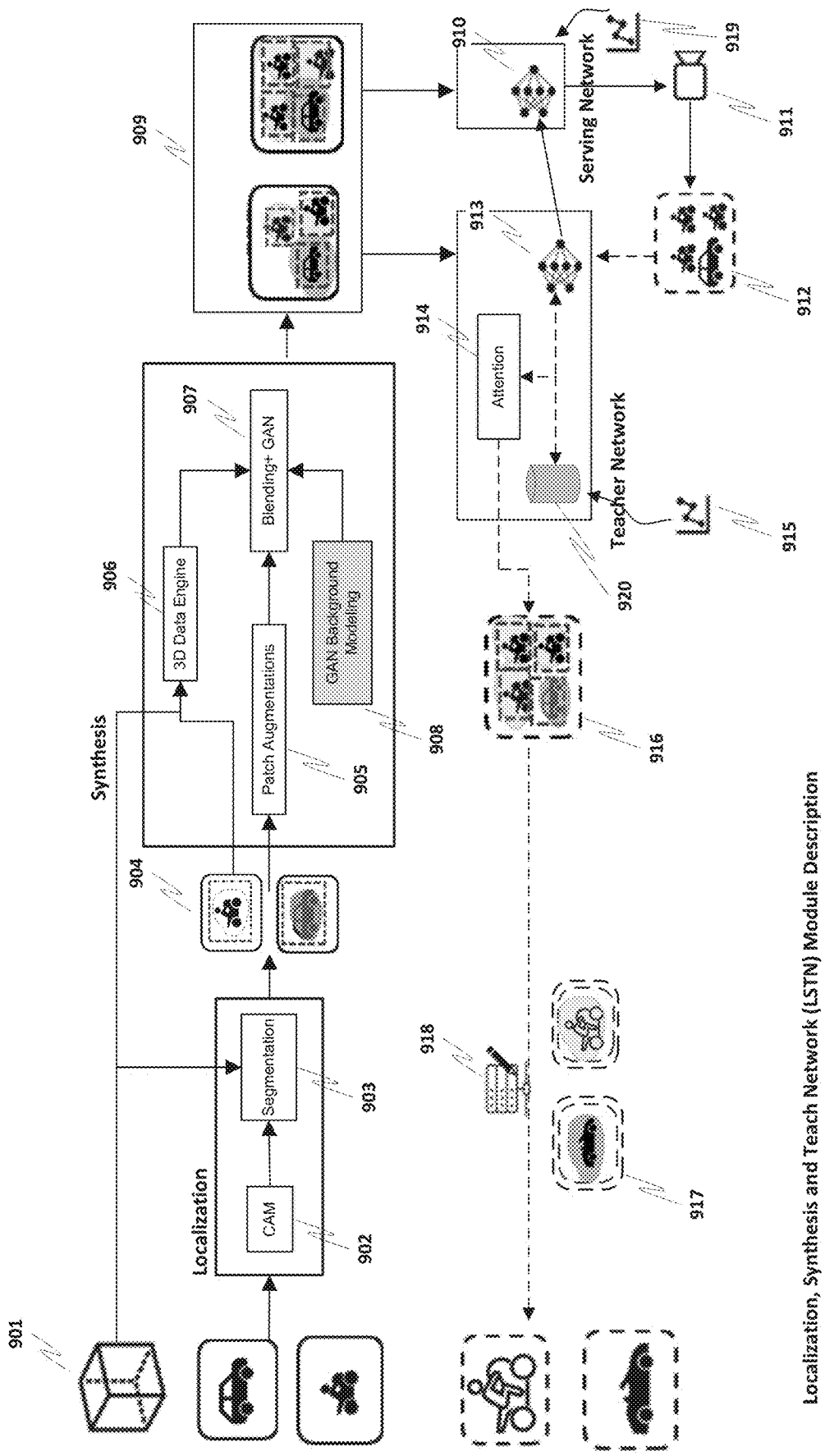
FIG. 9 illustrates the components that comprise the LSTN module and the sequential information flow and procedure within the LSTN components.

FIG. 9 is the LSTN module.

In the first pathway, given a set of images captured from the field, or via a custom object registration device, or even provided as 3D modeling of the objects (901 in FIG. 9), this module will perform the following main tasks. First, it will learn how to localize (902 in FIG. 9) and segment (903 in FIG. 9) the objects within the given image/scene following an unsupervised approach as no annotations about the objects' segmentation mask or bounding box are provided. This is accomplished using a cascade of two CNNs as described in the two-block diagram in FIG. 3 and FIG. 4 above.

Then, the segmented objects (904 in FIG. 9) will be used by the data synthesis engine in order to generate an annotated dataset (both object detection bounding boxes and segmentation masks) by merging objects (905 in FIG. 9) with generated backgrounds of a GAN-based mechanism (908 in FIG. 9), followed by a GAN enhanced image synthesis approach (909 in FIG. 9). In case 3D objects are also available in the input (901 in FIG. 9), these can be used by a 3D data synthesis engine (906 in FIG. 9) to generate synthetic scenes, also enhanced by a GAN (907 in FIG. 9).

All these synthesized data, which are provided, produced or generated from real and/or synthetic approaches (909 in FIG. 9), will be used to train the Teacher/Annotator network (413 in FIG. 4) and initialize a local external memory (915 in FIG. 9). This is a CNN as described in FIG. 5 above.

The Teacher/Annotation network will then be used to improve the performance of a network or networks that are trained in order to serve the particular model (910 in FIG. 8) in the field, for example on a vision system presented here for simplicity as a single camera (911 in FIG. 9). The performance of the Teacher/Annotation network (915 in FIG. 9) as well as the performance of the lightweight Deep CNN (919 in FIG. 9) is being evaluated from the user via a reporting process.

In the second pathway, the Teacher/Annotation network will be able to localize new objects (916 in FIG. 9), which are consequently been written (918 in FIG. 9) as new entries in the object database (917 in FIG. 9). The Teacher/Annotation network incorporates a memory (920 in FIG. 9) and an attention mechanism (914 in FIG. 9) in order to better identify similar objects from devices being deployed on the field. As the devices have similar views, the attention mechanism (914 in FIG. 9) allows the Teacher/Annotation module to better localize objects by incorporating information from similar objects that appeared in the past and are available in a local memory. The local memory stores feature/vector representations of the objects allowing the attention mechanism to improve the decisions taken by the Teacher/Annotation network. This scheme, characterized by increased learning capacity and large memory size, provides flexibility to the overall learning scheme while allowing the network that will be deployed at the edge devices to be relatively simple.

2.2.1. LSTN: Localization

Given a small number of images, typically 5 to 10 images per object, the Class Activation Map (CAM) of a classification Deep CNN is used for extracting soft object proposals and provide a weak labeling of the foreground pixels. To learn a robust CAM, a self-supervised learning task is first learnt. In particular, the system learns to rotate the object, finds relations between parts of the image, and learns the way to fill missing parts of the image. Also, given that the class label for the objects is known the system is also fine-tuned on the image classification task.

The Localization procedure comprises one or more of the following steps:
1. Provide a number of object images (901 in FIG. 9)
2. Select a classification Deep CNN architecture with Global Average Pooling layer (902 in FIG. 9)
3. Train the classification CNN on a self-supervised classification task (902 in FIG. 9)
4. Fine-tune the network on a supervised learning classification task (902 in FIG. 9)
5. Extract Class Activation Maps for all images (902 in FIG. 9)
6. Threshold CAMs and generate binary masks depicting foreground and background pixels (902 in FIG. 4)
7. Use this pixel level classification to train a second classification network to assign a pixel to a class by considering a multiscale evaluation plus a majority voting scheme (903 in FIG. 9)
8. Use generated masks to train a segmentation CNN (904 in FIG. 9)
9. Process images with the segmentation CNN and extract segmentation masks (904 in FIG. 9)
10. Fit rectangles (bounding boxes) around the generated masks (904 in FIG. 9)
11. Return the segmentation mask and bounding boxes for all input images (904 in FIG. 9)

The output of Step 10 of the localization module are object patches with segmentation masks (904 in FIG. 9) that are used by the data synthesis module to generate data for training the system.

Figure 10:
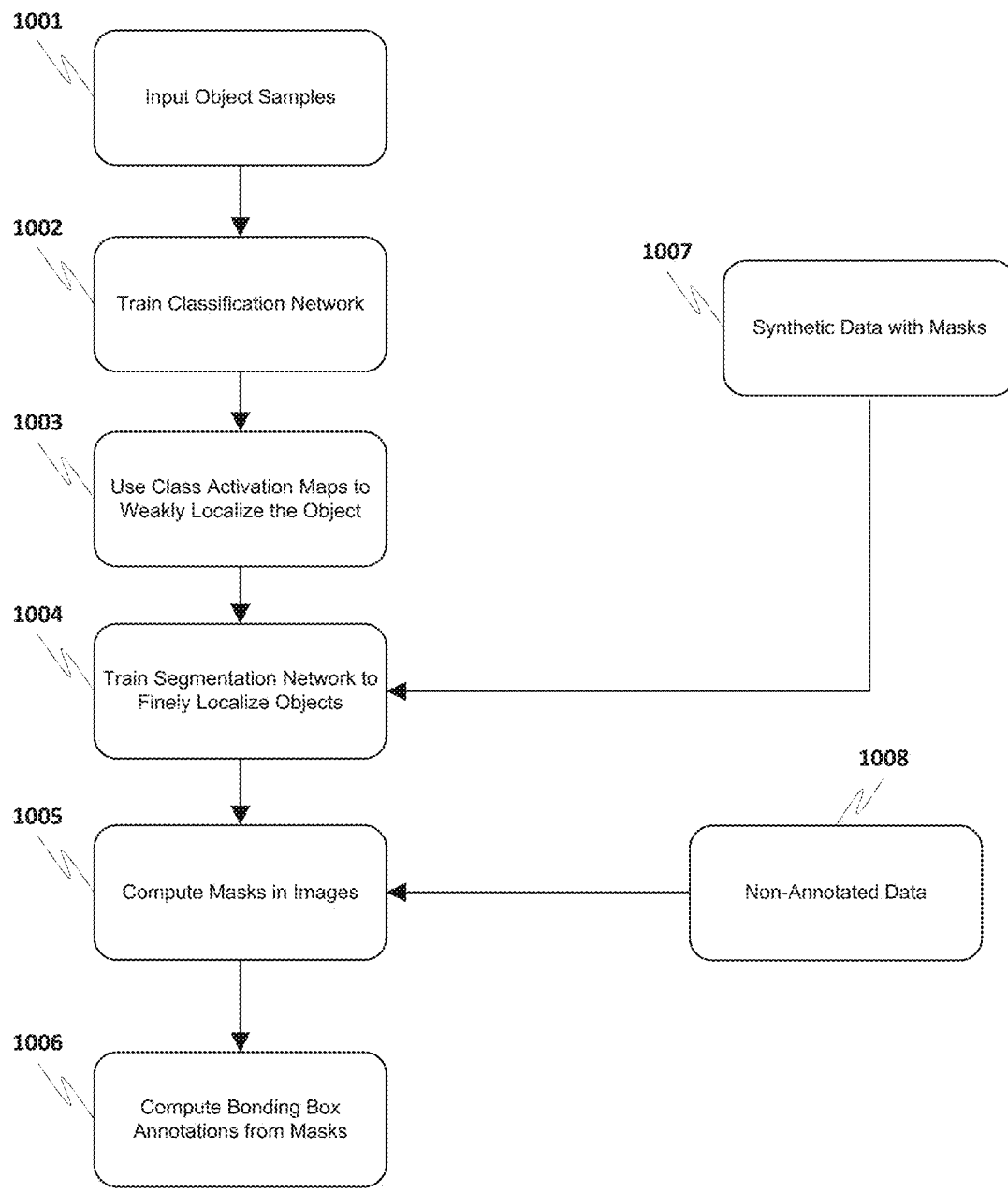
FIG. 10 is a flowchart showing the object localization process pipeline of the LSTN approach.

The object localization procedure is also being presented in FIG. 10. Given images of the object samples (1001 in FIG. 10) initially a classification network is trained to classify objects (1002 in FIG. 10). After training the network (1002 in FIG. 10) its Class Activation Maps are used in 1003 in FIG. 10 to weakly localize the object. This weak annotation is performed in pixel level allowing a segmentation network to learn more robustly to localize objects (1004 in FIG. 10). Once this network is ready, the annotation process can start by first computing the masks for all objects (005 in FIG. 10) and then computing the bounding boxes (1006 in FIG. 10). In case that synthetic data, together with their segmentation masks (1007 in FIG. 5), are available at the beginning, they are used as annotated samples to train the segmentation network (1004 in FIG. 10). Non-annotated data (1008 in FIG. 10) can then be submitted for annotation to 1005 in FIG. 10.

FIG. 10 is the localization procedure pipeline.

2.2.2. LSTN: Data Synthesis Module

Figure 11:
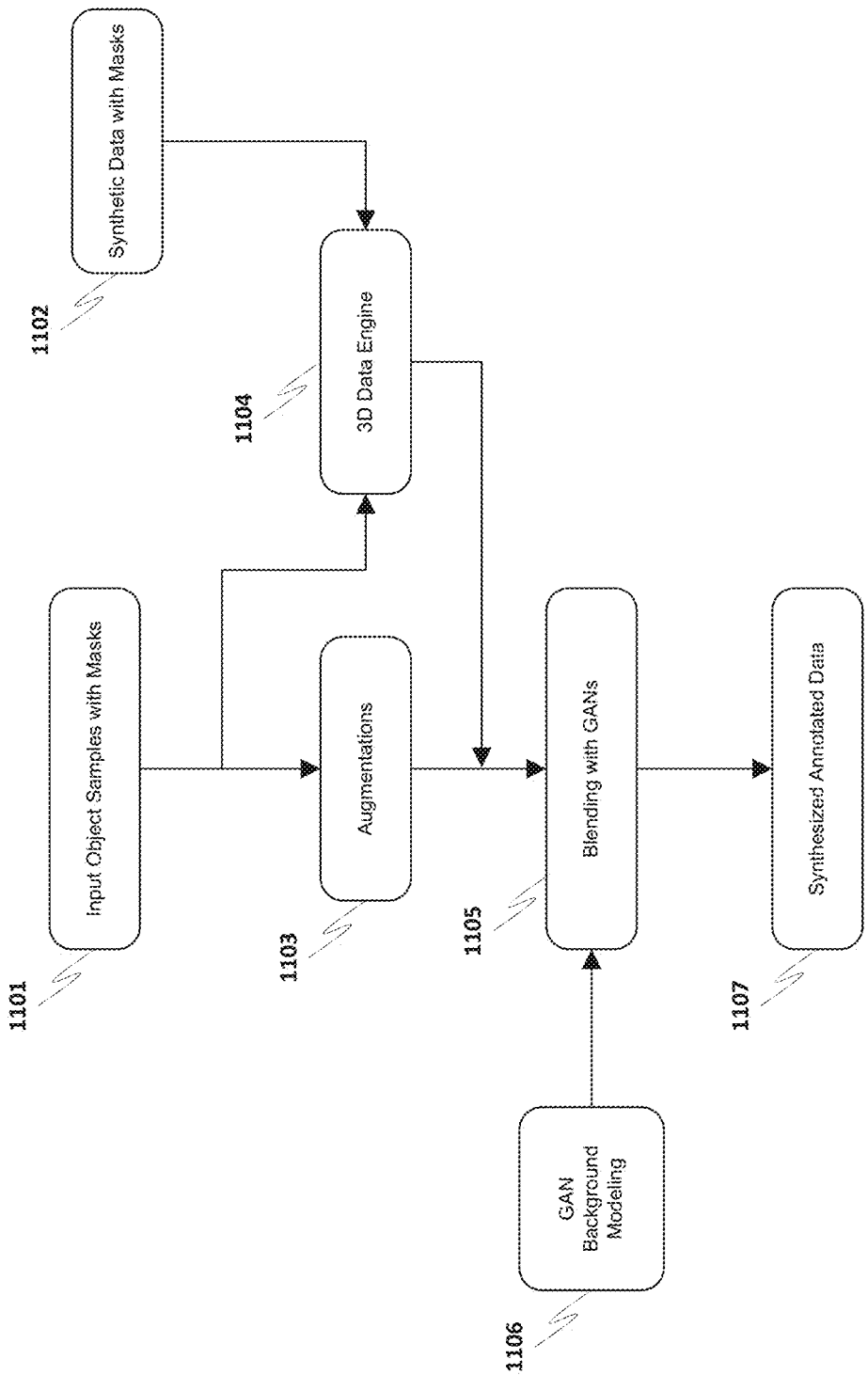
FIG. 11 is a flowchart showing the data synthesis process pipeline of the LSTN approach.

Given that a small number of objects together with the corresponding segmentation masks (1101 in FIG. 11) are available, the data synthesis module combines the backgrounds produced by a GAN (1106 in FIG. 1) with the segmented or provided (1101 in FIG. 11) objects, which can be further augmented (1103 in FIG. 11) and mixed under a GAN-based blending procedure (1105 in FIG. 11) using the backgrounds generated by the GAN (1106 in FIG. 11). Also, extra object samples can be produced by a 3D data engine (1104 in FIG. 11), in the case that 3D models are available, in order to further augment the objects' dataset. In this manner, a large number of annotated combinations is produced (1107 in FIG. 11). Whilst GANs are used as the core generative model, any similar approach like Variational Autoencoders and variations of Generative Models that can incorporate features like disentangled representations can be used.

FIG. 11 is a data synthesis pipeline.

This procedure is repeated every time a new object needs to be added by the customer, or a new object is detected by the Teacher/Annotator network by analyzing images captured from the field. Therefore, the incorporation of new objects in the detection process can be seamlessly performed through the continuous model update and the life-long learning approach introduced via the LSTN module.

The 3D data synthesis engine (1104 in FIG. 6) can also generate 3D renderings by using 2D views of the object captured in the field and segmented by the Teacher/Annotation network to be used as input object samples with masks (1101 in FIG. 6). In addition, the 3D data synthesis engine (1104 in FIG. 6) is able to learn the 3D mesh of the objects, perform a texture unwrapping on the 3D model and generate novel views by projecting the 3D object in various scenes with different illumination conditions. For this purpose, also inverse graphics combined with differentiable renderers and Generative Adversarial Networks (GANs) are used in 604. More specifically, if multiple views of an object are given, the system is able to train a GAN network to disentangle the 3D representation of the object estimated via inverse graphics, allowing the system to manipulate the scene parameters directly within the GAN generator. The parameters can include the viewing angle, the lighting scheme, the reflectance, the scale and any other parameter available in modern 3D renderers. The advantage of this later approach is that the 3D structure of the objects is being recovered by the 2D views via inverse graphics.

2.2.3. LSTN: Teacher/Annotation Network Training

The role of this network is two-fold. First to be used as a Teacher network aiming to train the actual network to be deployed in the field, and secondly to annotate newly acquired data from the deployed devices. More specifically, given that a large amount of annotated data is produced, a large capacity detection and segmentation CNN network is trained—namely the Teacher/Annotation network (913 in FIG. 9). Whilst this network can also be deployed as is at the edge, it is preferable to have a dedicated network for the edge device with emphasis on the hardware capabilities and the specification of the inference/processing time when running at the edge. In this manner, instead of deploying this deep CNN model (i.e. the Teacher network), a lightweight CNN model is trained on the same data (909 in FIG. 9) in order to optimize the performance and meet the system specifications at the deployment phase. This Teacher/Annotation Network is also used to annotate newly acquired data from the field (912 in FIG. 9). The utilization of an external memory (915 in FIG. 9) and an attention mechanism (914 in FIG. 4) provides a significant robustness to the model, as it can robustly utilize information across time to better identify the objects from the field and avoid poor performance due to distribution shift that is usually caused by changing conditions. The Teacher/Annotation Network is also sending write operation for the object database (901 in FIG. 9) in order to add entries collected by the field.

The lightweight CNN model can be also trained in a teacher-student approach using the Teacher/Annotation network of the LSTN module via knowledge distillation, a process where a lightweight Deep CNN is being trained on high-level features extracted by another network. Knowledge distillation training can be applied on object detection tasks by forcing the student networks to imitate the teacher's network response in the regions where the objects appear. For example, in Single Shot Detection Networks these regions can be the regions indicated by the anchor boxes and for Region Proposal Networks the regions indicated by the region proposal components.

Figure 12:
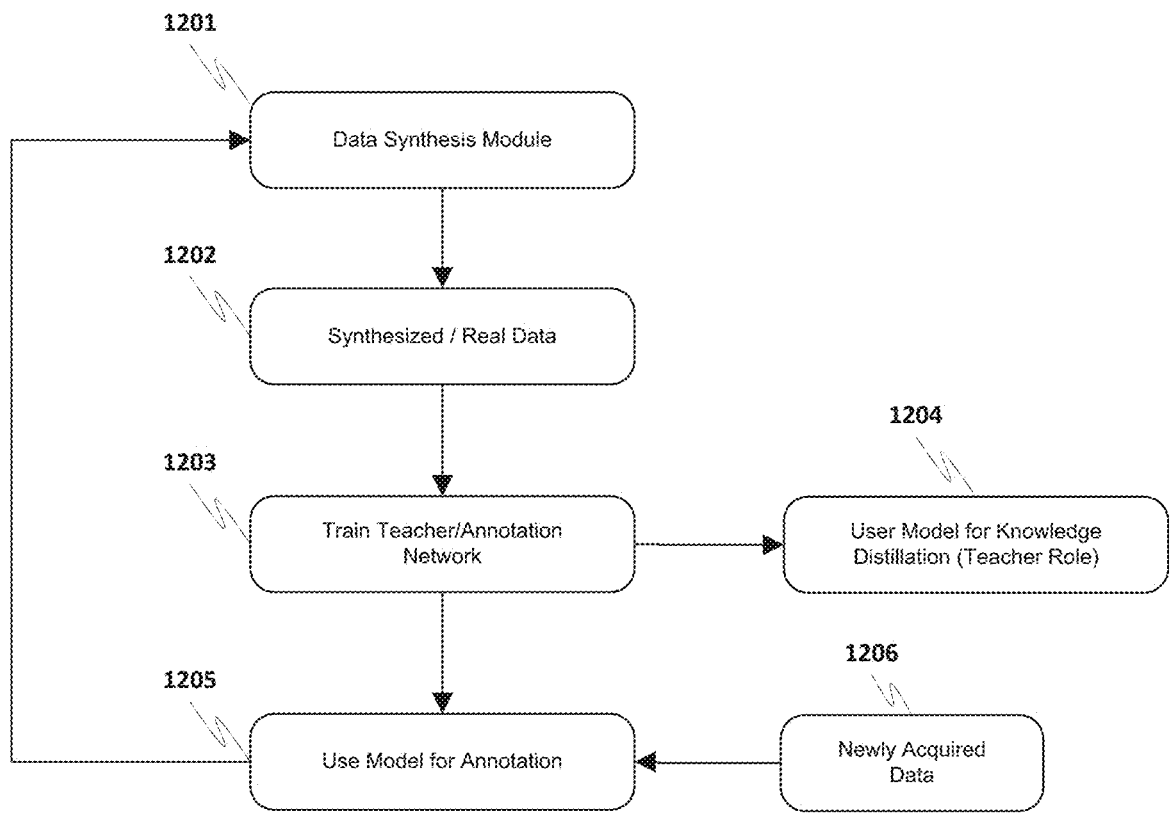
FIG. 12 is a flowchart showing the Teacher/Annotation workflow pipeline.

The workflow for the Teacher/Annotation network is presented in FIG. 12.

The data synthesis module (1201 in FIG. 12) feeds with synthesized and real data (1202 in FIG. 12) the Teacher/Annotation network (1203 in FIG. 12). Following a training phase, the Teacher/Annotation network is able to a) distill the knowledge in a smaller network trained for deployment at the edge (1204 in FIG. 12) or to b) annotate (1205 in FIG. 12) newly acquired data (706 in FIG. 7). The annotated data are sent to the data synthesis module (1201 in FIG. 12) using a data feedback mechanism, to be used for continuous model updates and incremental learning of the incorporated CNN models.

FIG. 12 is the Teacher/Annotation workflow pipeline.

2.2.4. LSTN: The Serving Network

The purpose of the system is to continuously train and deploy models in the field. The serving network (6910 in FIG. 9) is the component that applies the acquired knowledge in the actual world, and, in this manner, it needs to be compliant with several constraints immanent in the real world. Most importantly, this network should be optimized to operate in available hardware, which in most cases is power-efficient and thus features limited computation resources in terms of operations per second, bit representation (floating point or integer only arithmetic) or memory. In this manner, this network is optimized to match the target hardware specifications. To achieve this, the network is pruned, quantized and distilled by the Teacher/Annotation CNN network. The architecture can be selected by the user across a number of architectures that are initially verified to fit to the target architecture. The Teacher/Annotation network together with the pruning scheme ensure that the model exhibits good generalization properties and the quantization-based learning scheme is guaranteeing that the model will not be affected by the target hardware limitations in precision during numerical operations.

However, given that the scale of deployed devices (911 in FIG. 9) can be extremely large for example millions of mobile phones, or cameras or cloud services, it is important to selectively sample new data given some criteria related to the distribution and the characteristics of the available training data. In this manner the serving network incorporates a sampling mechanism which is monitoring the samples being inferred (processed by the lightweight/serving Deep CNN) via analyzing data statistics or by detecting anomalies in data. By analyzing statistics, it is ensured that samples grabbed from edge devices cover the whole distribution of the data and by detecting anomalies it is ensured that samples that were out of the distribution are sampled too.

Figure 13:
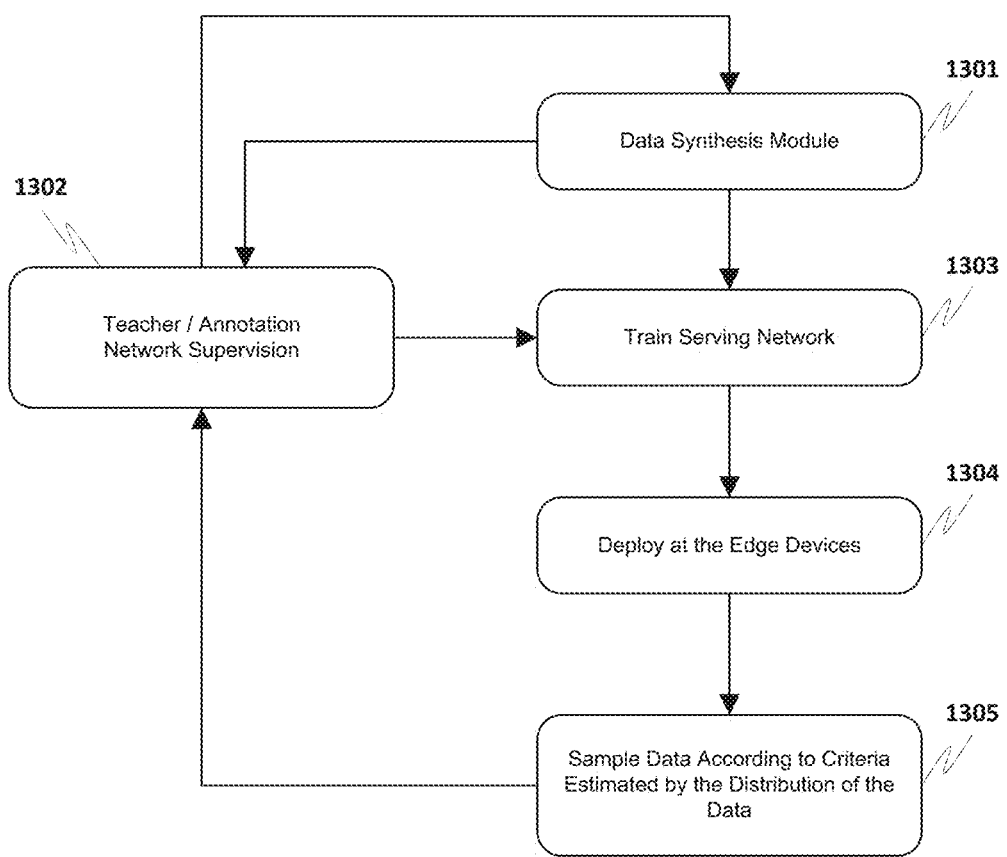
FIG. 13 is a flowchart showing the serving network workflow pipeline

The workflow of the serving network is presented in FIG. 13. Initially, the data synthesis module (1301 in FIG. 13) generates data to be used for training of the serving network (1303 in FIG. 13). Those data have been already used to train the Teacher/Annotation network (1302 in FIG. 13) in the previous step, as depicted also in FIG. 12 and also denoted here by the connection between 1301 and 1302 in FIG. 13. The training of the serving network (1303 in FIG. 13) is guided by the Teacher/Annotation network (1302 in FIG. 13). Once the model is trained, it can be deployed at the edge devices (1304 in FIG. 13) for operational purposes. While the model is deployed, it can be also used to sample images (1305 in FIG. 13) using specific criteria related to the data distribution. These sampled data are then fed into the Teacher/Annotation network to improve the data synthesis module.

FIG. 13 is the serving network workflow pipeline.

Additionally, the systems, methods and protocols of one aspect of this technology can be implemented on a special purpose computer, a programmed micro-processor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can be used to implement the various methods, protocols and techniques according to this technology.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed methods may be readily implemented in software on an embedded processor, a micro-processor or a digital signal processor. The implementation may utilize either fixed-point or floating-point operations or both. In the case of fixed-point operations, approximations may be used for certain mathematical operations such as logarithms, exponentials, etc. Alternatively, the disclosed system may be implemented partially or fully in hardware using standard logic circuits or VLSI design. Whether software or hardware is used to implement the systems in accordance with this technology is dependent on the speed and/or efficiency requirements of the system, the particular function, and the particular software or hardware systems or microprocessor or microcomputer systems being utilized. The systems and methods illustrated herein can be readily implemented in hardware and/or software using any known or later developed systems or structures, devices and/or software by those of ordinary skill in the applicable art from the functional description provided herein and with a general basic knowledge of the audio processing arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this technology can be implemented as program embedded on personal computer such as an applet, JAVA.RTM. or CGI script, as a resource residing on a server or computer workstation, as a routine embedded in a dedicated system or system component, or the like. The system can also be implemented by physically incorporating the system and/or method into a software and/or hardware system, such as the hardware and software systems of an electronic device.

Any non-transitory computer-readable information storage media, having stored thereon instructions, that can be executed by one or more processors and cause to be performed the methods described above.

Finally, the disclosed methods may be readily implemented as services or applications accessible from the user via a web browser. The software can reside in a local server or a remote server. The software may be written in JavaScript utilizing JavaScript Web APIs such as the Web Audio API or make use of Web Assembly.

It is therefore apparent that there has been provided, in accordance with the present technology, systems and methods for supervised Deep Learning (DL) systems to learn directly from unlabeled data without any user annotation, a procedure that is considered as a label-free learning scheme. While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this technology.

The invention claimed is:

1. A method for learning to generate bounding box and segmentation masks from categorical labeled images comprising:
   collecting two or more images from two or more categories, that are fed, as in, in a process pipeline, and for each of said images:
   localizing boundaries of objects within the images in an unsupervised learning manner by utilizing a deep Convolutional Neural Network (CNN) classification model, with a global average pool layer, configured to generate soft object proposals and configured to generate weak binary masks around the objects by applying a threshold on activation maps of the classification CNN;
   using the threshold to define a segmentation mask and assign pixels in object/non-object categories;
   modeling a distribution of object/non-object pixels represented as vectors learnt from the classification CNN;
   using the modeled distribution and a threshold to assign pixels to object/non-object categories and extract segmentation masks;
   training a segmentation CNN model on extracted coarse segmentation masks, thereby determining finer object boundaries;
   generating novel annotated images by arbitrarily blending segmented objects with other background images;
   generating bounding boxes by fitting a rectangle on the fine segmentation masks; and
   outputting the annotated images.

2. The method of claim 1, wherein the deep CNN classification model is trained to localize objects within images via activation maps.

3. The method of claim 1, wherein the CNN segmentation model is trained to perform fine object segmentation and bounding box regression.

4. A non-transitory computer readable information storage medium having stored therein instructions, that when executed by one or more processors, cause a method to be performed for learning to generate bounding box and segmentation masks from categorical labeled images, comprising:
   collecting two or more images from two or more categories, that are fed, as is in a process pipeline, and for each of said images:
   localizing boundaries of objects within the images in an unsupervised learning manner by utilizing a deep Convolutional Neural Network (CNN) classification model, with a global average pool layer, configured to generate soft object proposals and configured to generate weak binary masks around the objects by applying a threshold on activation maps of the classification CNN;
   using the threshold to define a segmentation mask and assign pixels in object/non-object categories;
   modeling a distribution of object/non-object pixels represented as vectors learnt from the classification CNN;
   using the modeled distribution and a threshold to assign pixels to object/non-object categories and extract segmentation masks;
   training a segmentation CNN model on extracted coarse segmentation masks, thereby determining finer object boundaries; generating novel annotated images by arbitrarily blending segmented objects with other background images;
   generating bounding boxes by fitting a rectangle on the fine segmentation masks; and
   outputting the annotated images.

5. The media of claim 4, wherein the deep CNN classification model is trained to localize objects within images via activation maps.

6. The media of claim 4, wherein the CNN segmentation model is trained to perform fine object segmentation and bounding box regression.

* * * * *